United States Patent Office 2,985,662
Patented May 23, 1961

2,985,662
PROCESS OF PREPARING 2-ALKYL-1-HYDROXY-ALKYL SULFATES

Carl E. Johnson, Westchester, and Fred G. H. Lee, Chicago, Ill., assignors to Nalco Chemical Company, a corporation of Delaware No Drawing. Filed July 16, 1958, Ser. No. 748,782

4 Claims. (Cl. 260—309.6)

This invention relates to 2-alkyl-1-hdyroxyalkyl imidazoline sulfates of the formula:

Formula I

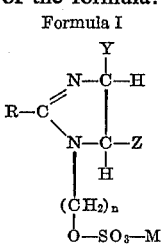

where R in the above formula is an organic hydrocarbon group which may contain from one to twenty-three carbon atoms in chain length. Y and Z may be either hydrogen or lower aliphatic hydrocarbon groups of not more than six carbon atoms in chain length, $n$ is an integer of from two to four, and M may be either hydrogen, alkali metal, or ammonium. The invention is also concerned with the method of preparing compounds of the type shown in Formula I from 1-hydroxyalkyl substituted imidazolines and sulfating agents such as chlorosulfonic acid or $SO_3$.

The 2-alkyl-1-hydroxyalkyl substituted imidazolines, which are used to prepare the compounds of this invention, are well known and have been described in numerous publications. They are generally prepared by reacting a monocarboxylic acid with a hydroxyalkyl substituted alkylene diamine at a temperature sufficient to cause cyclization. The preparation of typical imidazolines as well as a description of the chemistry of these compounds, may be found in the references, "The Chemistry of the Imidazolines and Imidazolidines" by Ferm and Riebsomer, Chemical Reviews, vol. 54, No. 4, August 1954; and in Wilson U.S. Patent 2,267,965; the disclosure of which references are incorporated herein by reference.

The preferred type of starting imidazoline used to prepare the sulfate esters are those formed by reacting a monocarboxylic acid with aminoethyl ethanolamine. Similar type starting imidazolines may be prepared by reacting the imidazoline prepared from a monocarboxylic acid and ethylene diamine with ethylene oxide, 1,3-propylene oxide or a butylene oxide, whereby a hydroxyalkyl group is substituted on the nitrogen in the 1-position of the ring. Starting imidazolines of the type are shown in Formula II below:

Formula II

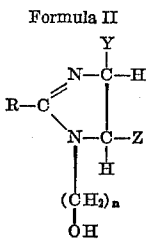

where R, Y, Z and $n$ have the same significance previously described in Formula I.

For purposes of illustration, the following typical starting imidazolines are listed below:

1-(2-hydroxyethyl)-2-methyl imidazoline;
1-(2-hydroxyethyl)-2-undecyl imidazoline;
1-(2-hydroxyethyl)-2-hydrogenated tallow imidazoline;
1-(2-hydroxyethyl)-2-heptadecyl imidazoline;
1-(3-hydroxypropyl)-2-coco imidazoline;
1-(2-hydroxyethyl)-2-phenyl imidazoline;
1-(2-hydroxyethyl)-2-methyl-3-methylimidazoline; and
1-(2-hydroxyethyl)-2-methyl-4-methylimidazoline.

It will be readily apparent that the substituent in the 2-position can be varied to produce a variety of radicals by selecting different organic acids having various types of molecular configurations, such as chain length variations, aromatic nuclei, and hydroxyl substituents such as the hydroxyl group in ricinoleic acid. In addition to using pure monocarboxylic acids, it is expedient and often desirable to use mixed acids, such as are commonly derived from the natural fats and oils. In the latter case, the nomenclature of imidazolines derived from the mixed fat and oil acids is complicated; and for purposes of simplification, the substituent on the 2-position, when such acids are used, are referred to herein in terms of the derivative mixed acids from which they are formed.

Preferred products of the invention are produced by reacting fatty acids having from six to eighteen carbon atoms in chain length with aminoethyl ethanolamine and thereafter introducing a sulfate group. This class of sulfated imidazolines may be generally defined by Formula III:

Formula III

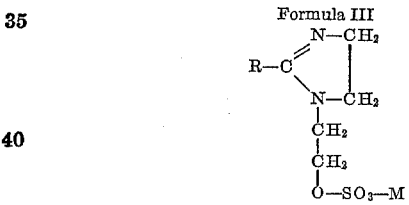

where R represents an aliphatic hydrocarbon radical of from five to seventeen carbon atoms in chain length, and M is a substituent comprising either hydrogen, alkali metal, or ammonium. Typical imidazoline sulfates of the Formula III type are:

1-(2-sodium ethyl sulfate)-2-heptyl imidazoline;
1-(2-ammonium ethyl sulfate)-2-heptadecyl imidazoline;
1-(2-sodium ethyl sulfate)-2-heptadecadienyl-(8,11)-imidazoline;
1-(2-potassium ethyl sulfate)-2-pentadecyl imidazoline;
1-(2-sodium ethyl sulfate)-2-heptadecenyl-8-imidazoline;
1-(2-sodium ethyl sulfate)-2-undecyl imidazoline.

The imidazoline sulfates produced in accordance with the teachings set forth herein are ampholytic-type materials which have a variety of uses in such fields as textiles, corrosion inhibition, detergency and emulsification. They are able to produce effects not achieved with prior art compositions.

In order to prepare the imidazolines of the invention, it was found necessary to use a special sulfating technique to insure good yields of product, as well as to prevent side reactions from occurring. In its simplest form, the imidazoline is dissolved in an acyclic water-miscible organic solvent and reacted with preferably at least two moles of a sulfating agent at a temperature not in excess of 100° C. for a period of time sufficient to produce a substantial amount of sulfuric acid ester of the particular imidazoline employed. It is interesting to note that when one mole of the sulfating agent is employed relatively poor results are obtained, which may be explained by the fact that it is necessary first to form the imidazolinium sulfate before the sulfating agent is capable of sulfating the side chain hydroxyl group of imidazoline. The quantity of sulfating agent used, therefore, should be in excess of the quantity required to form a simple imidazolinium salt of the sulfating agent and the imidazoline. While either $SO_3$ or chlorosulfonic acid may be used in preparing the sulfate esters, it is preferred to use chlorosulfonic acid since the material is more easily handled; and the results obtained, insofar as yield and purity of product are concerned, are superior.

The particular solvents employed in the preparation of the imidazoline sulfates may be selected from such organic solvents as chloroform, petroleum naphthas of the well-known "Skellysolve" type solvents, which latter class of solvents may be defined as petroleum naphthas having a boiling point with the range from 68° F. to 275° F. The temperature at which the reaction is conducted is somewhat critical, and under no circumstances should it exceed 100° C. and preferably should not exceed 80° C. In the case of imidazolines containing alkyl substituents in the 2-position of less than six carbon atoms, it is oftentimes well to run the reaction in the cold, viz., temperatures below 0° C. The reason for the criticality of the temperature conditions is that excessive temperatures tend to cause a charring or ring fission, which, of course, renders the resultant products not suitable. The solvent should be substantially inert under the conditions of the reaction and the temperatures used should be below those at which substantial charring occurs.

In order to demonstrate the preparation of several typical imidazoline sulfates, the following are given by way of example:

*Example I*

The following represents a charge to the reaction vessel, which was a round-bottom, three-neck flask fitted with a reflux condenser, stirrer, and thermometer: chlorosulfonic acid 53.40 grams, 1-(2-hydroxyethyl)-2-methyl-imidazoline 58.6 grams, and 200 cc. of chloroform. The imidazoline was dissolved in the chloroform and was added over a 30 minute period to the chlorosulfonic acid, which was held at a temperature of between −10° and 0° C. with the aid of a Dry Ice-acetone bath. After the addition had been completed, the Dry Ice bath was removed and the reaction mixture was stirred for five hours with the temperature being gradually allowed to rise to normal room temperature, viz., 23°±3° C.

At the end of the five-hour mixing cycle, a light yellow product was formed which was not dispersible in the chloroform solvent. The chloroform was separated, and the resultant product was washed with ethyl ether and acetone several times and was finally treated with absolute methanol. The resultant product was a white solid which precipitated from the methanol. It was then filtered and washed with methanol. The final product had a melting point of 225° to 227° C. Analysis: Calculated C=61.07%, H=10.25%, N=6.47%, and S=7.41%; found, C=60.32%, H=10.25%, N=6.52%, and S=7.38%. The product thus produced was 1-(2-ethyl sulfate)-1-methyl imidazoline.

*Example II*

The equipment used was the same as in Example I. The charge to the flask consisted of 71.48 grams of chlorosulfonic acid, 145.5 grams of 1-(2-hydroxyethyl)-2-hydrogenated tallow imidazoline and 300 cc. of chloroform. The conditions of the reaction were substantially the same as in Example I insofar as the chloroform solution of imidazoline addition to the chlorosulfonic acid was concerned. The reaction was conducted at room temperature. At the end of this time, the product was then heated to 60° C. for two hours. The product precipitated was a dark yellow wax. It was treated with water to remove the excess chlorosulfonic acid. The resultant solid was washed with acetone. The melting point of the finished material, which had been recrystallized twice from hot methanol, was 145–150° C. This compound was 1-(2-ethyl sulfate)-2-hydrogenated tallow imidazoline.

*Example III*

The equipment was the same as in Examples I and II, with the charge to the flask being as follows: 1-(2-hydroxyethyl)-2-coco imidazoline, 75 grams; "Skellysolve C," 400 milliliters and chlorosulfonic acid, 71.5 grams. The imidazoline was dissolved in the "Skellysolve C" and was stirred with the chlorosulfonic acid being added dropwise at a temperature of 25°±5° C. for 30 minutes. The temperature during the addition of the chlorosulfonic acid remained at 60°±5° C. The mixture was heated until the temperature had risen to 70° C. This temperature was maintained for two hours and as the reaction mixture cooled, a large, gummy, dark residue separated at about 40° C. The product was washed with ice-cold water in order to remove the chlorosulfonic acid. The product was recrystallized from 50% methanol-water solution. This product had a melting point of 155°–163° C. and was 1-(2-ethyl sulfate)-2-coco imidazoline.

*Example IV*

The products prepared in Examples I, II and III were prepared as shown except that only one mole of chlorosulfonic acid was used and the imidazolines were added to the reaction as their sulfate salts.

As can be seen from the above examples, the imidazoline dissolved in the solvent may be added to the chlorosulfonic acid or the chlorosulfonic acid may be added to the imidazoline with good results being obtained in either case. Ultra violet spectra studies on the above products indicated that the reaction had not ruptured the heterocyclic ring and that the ester formation had been substantially complete. Other compounds were made using lesser amounts of the sulfating agent and it was found poor yields resulted which was probably accounted for by salt formation rather than the desired esterification.

The above products are readily converted to their alkali metal or their ammonium salt forms by treating the products with chemically equivalent amounts of such bases as sodium or potassium hydroxide, sodium or potassium carbonate and the like, or ammonium hydroxide may be used in the case where the ammonium salt form is desired. The solubility of the sulfuric acid esters in water varies with some being soluble in hot and/or cold water with others being only slightly dispersible. The solubility is usually related to the various substituents attached to the imidazoline ring. The various alkali metal or ammonium salts are, however, for the most part, completely soluble in cold water and have a tendency to foam slightly in their dilute aqueous solutions, e.g., 1–5% by weight.

One of the most interesting features of the invention is the use of the compositions in the softening of the hair to make it more manageable from the standpoint of combing, setting, and the like.

Having thus described our invention in all its aspects, it is claimed as follows:

1. The process of sulfating a 2-alkyl-1-hydroxyalkyl imidazoline of the formula:

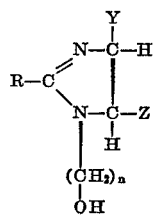

where R is an organic hydrocarbon group of from 1 to 23 carbon atoms in chain length, Y and Z are from the group consisting of hydrogen and lower aliphatic hydrocarbon groups of not more than 6 carbon atoms in chain length and $n$ is an integer of from 2 to 4, which comprises dissolving said imidazoline in an acylic water immiscible, organic solvent which is substantially inert under the conditions of the reaction, and then reacting the dissolved imidazoline with a sulfating agent in an amount in excess of that required to form a simple imidazolinium salt of the sulfating agent and said imidazoline, at a temperature below that at which substantial charring occurs.

2. The process of claim 1 where R is an aliphatic hydrocarbon group of from 1 to 23 carbon atoms in chain length, Y and Z are hydrogen, $n$ is 2, and the sulfating agent is chlorosulfonic acid.

3. The process of claim 1 where the quantity of the sulfating agent used is at least two moles per mole of imidazoline.

4. The process of claim 1 in which the temperature used does not exceed 100° C.

References Cited in the file of this patent

UNITED STATES PATENTS

| | | |
|---|---|---|
| 2,154,922 | Waldmann et al. | Apr. 18, 1939 |
| 2,199,780 | Chwala et al. | May 7, 1940 |

FOREIGN PATENTS

| | | |
|---|---|---|
| 705,132 | Germany | Apr. 18, 1941 |
| 211,923 | Switzerland | Jan. 16, 1941 |

OTHER REFERENCES

Houben: "Die Methoden der Org. Chem." (3rd ed.), vol. 3, p. 6 (1943).